Patented Mar. 23, 1943

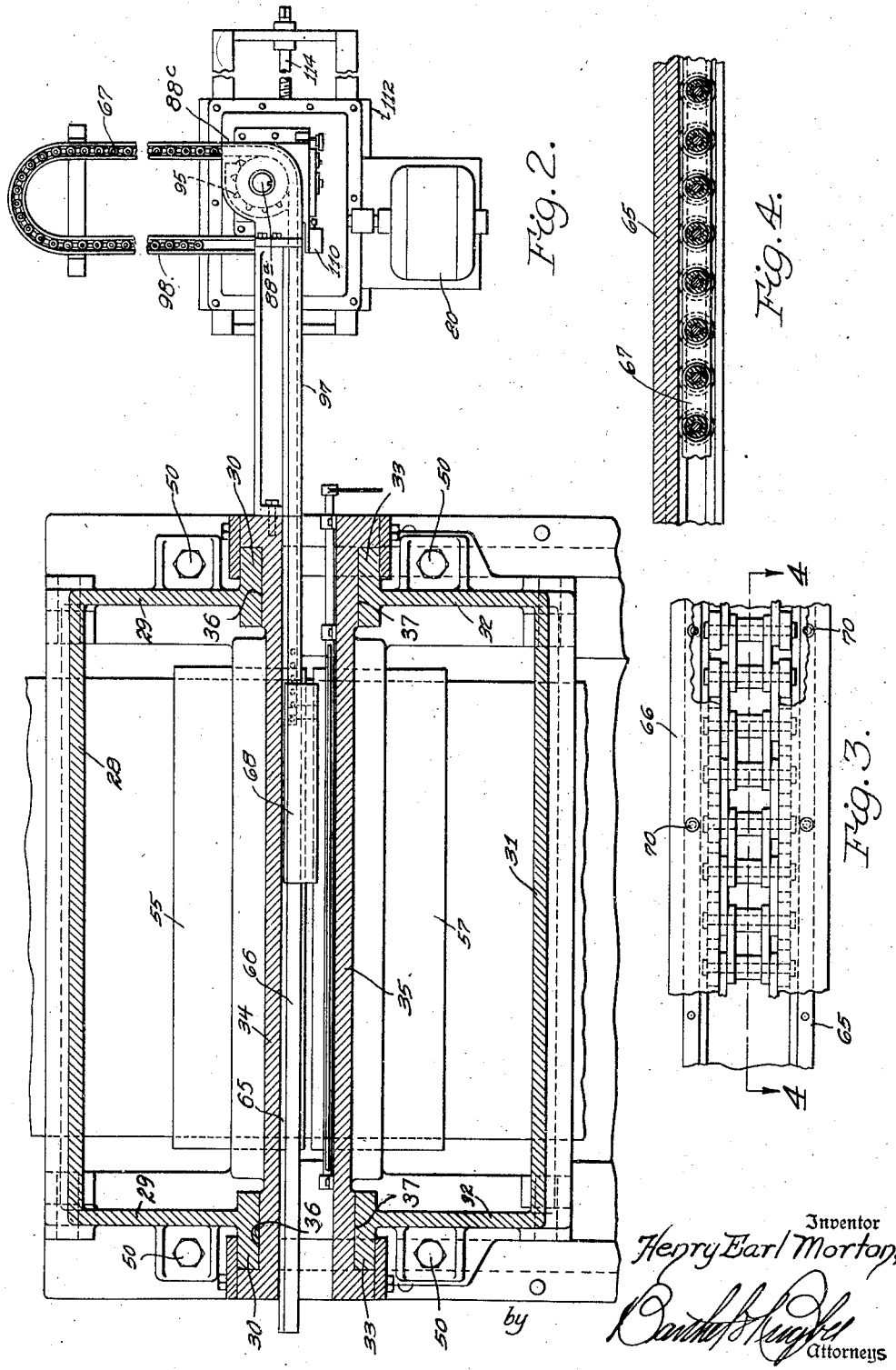

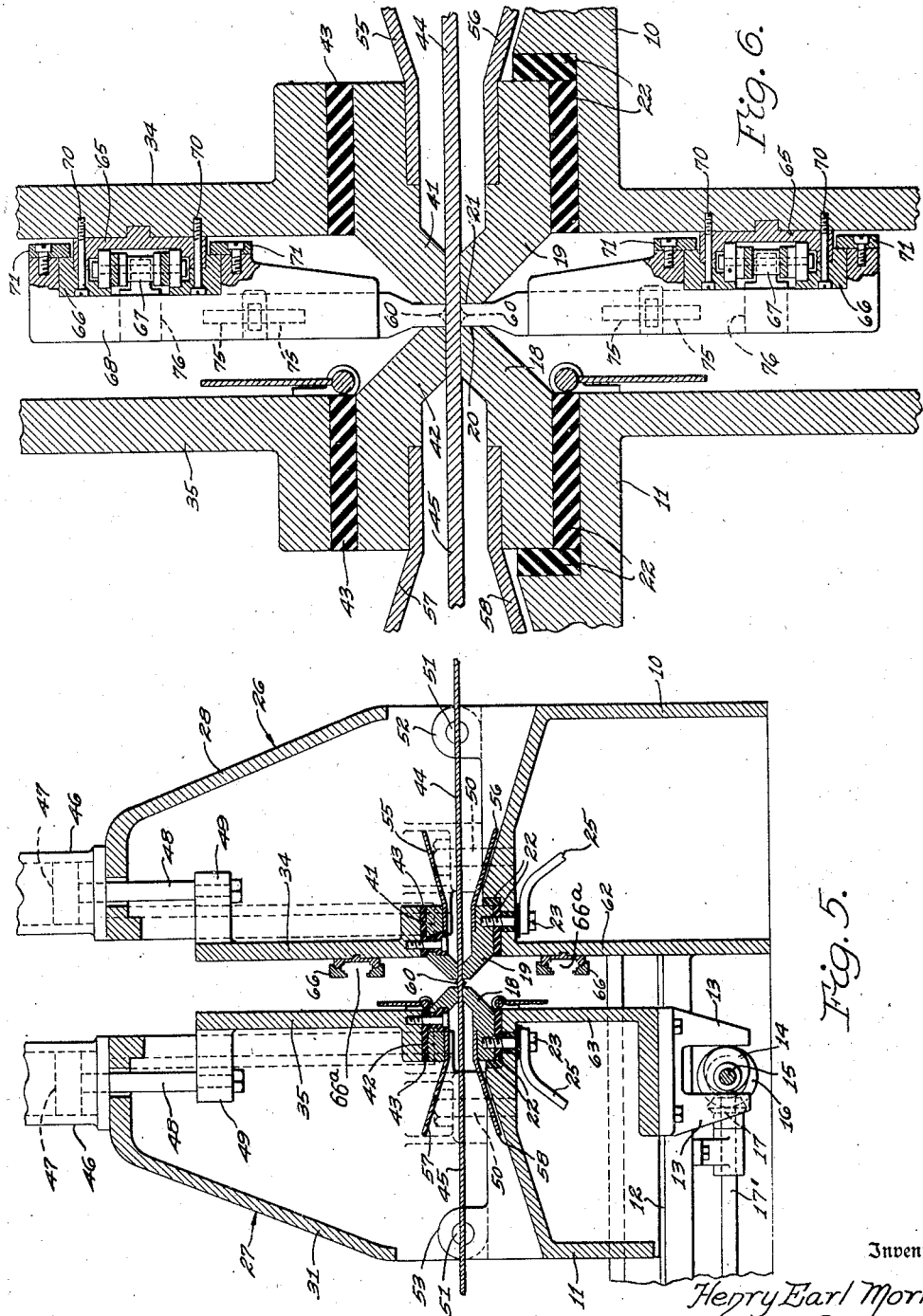

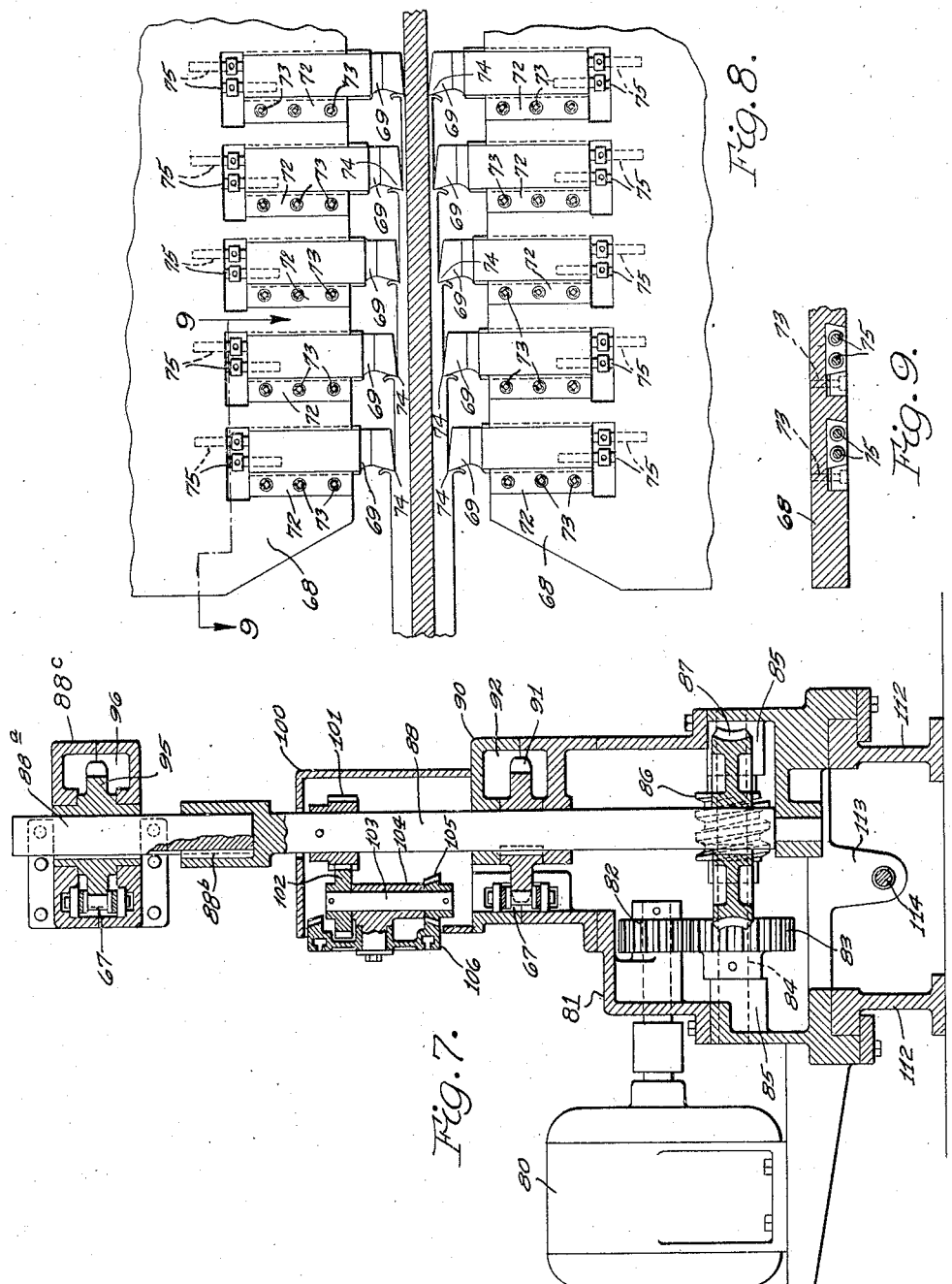

2,314,656

UNITED STATES PATENT OFFICE 2,314,656

WELDING AND FLASH REMOVING MACHINE

Henry Earl Morton, Muskegon Heights, Mich.

Application October 17, 1940, Serial No. 361,487

6 Claims. (Cl. 90—33)

This invention relates generally to welding apparatus and more particularly to butt welding apparatus having provision for removing excess material from the welded joint.

It has usually been the practice in butt welding metallic sheets together to hold the sheets in separate clamps and bring edges of the sheets together under force during flow of the welding current in order to obtain a desired strong weld. This forcing or jamming of the edges of the sheets together causes the metal to be upset resulting in so-called welding flash which is required to be removed. In the past, the usual procedure has been to unclamp the welded together sheets and move the metallic sheet to a position beneath cutters where it is clamped in place and where the so-called flash is removed by the cutters. To clamp the sheets for the welding operation, then unclamp the welded sheet, move it to another position and apply clamps to hold the sheet for removal of the flash by the cutter is obviously laborious and the time required for the clamping and unclamping of the sheets or welded sheet adds greatly to the cost of producing continuous sheet metal which is of course objectionable.

Accordingly, it is an object of the present invention to provide a new and improved machine by means of which metallic sheets may be butt welded together and the so-called welding flash removed without need of shifting the welded together sheets from the position in which they are welded together.

Another object of the invention resides in the arrangement of flash removing cutters between spaced clamps and welding electrodes such that the clamps and electrodes are utilized to hold the sheet during the flash removing operation.

Other objects of the invention will become apparent from the following detailed description taken in connection with the accompanying drawings in which:

Fig. 2 is a view partly in cross section and partly in elevation of the machine, taken along the line and in the direction of the arrows 2—2 of Fig. 1;

Fig. 3 is a fragmentary detail view of a chain drive for driving reciprocating flash removing cutters;

Fig. 4 is a view shown in longitudinal section of the chain and track therefor, taken along the line and in the direction of the arrows 4—4 of Fig. 3;

Fig. 5 is a view shown in vertical longitudinal section of the machine and taken along the line 5—5 of Fig. 1;

Fig. 6 is an enlarged fragmentary view of the machine, taken along the line and in the direction of the arrows 6—6 of Fig. 1;

Fig. 7 is a vertical cross sectional view of the machine, taken along the line and in the direction of the arrows 7—7 of Fig. 1;

Fig. 8 is an enlarged fragmentary view to show primarily the flash removing cutters of the present machine; and Fig. 9 is a detail sectional view, taken along the line and in the direction of the arrows 9—9 of Fig. 8.

Figure 1:
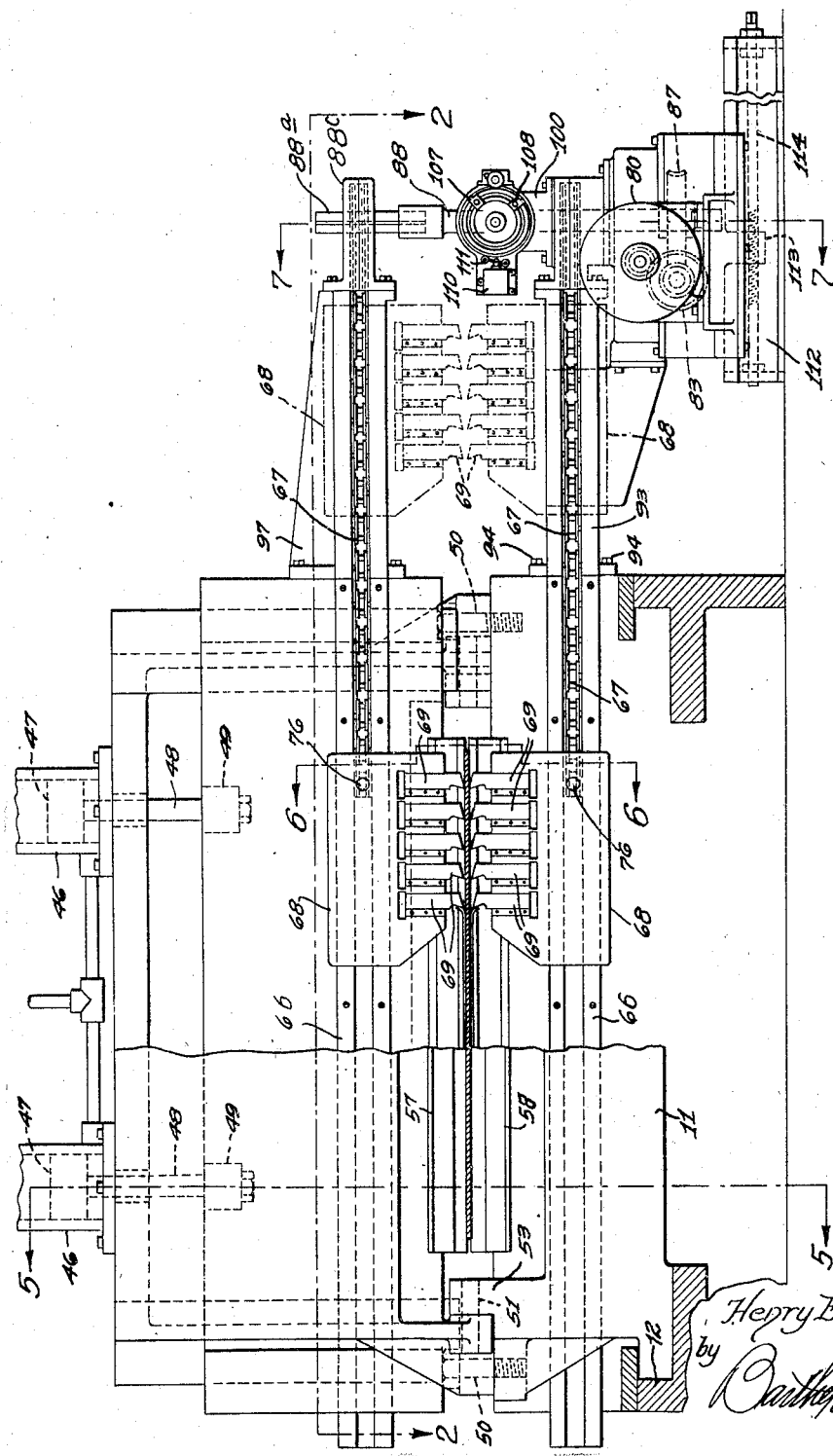
Figure 1 is an end elevational view partly broken away and in section of a combined butt welding and flash removing machine.

Referring to the drawings by characters of reference, the present machine includes a base of sectional construction comprising a stationary section 10 and a movable section 11. The movable section 11 of the base is slidably supported and guided by guideways or tracks 12 for movement horizontally toward or away from the stationary section 10, the purpose of which is herein described in the description of operation of the machine. As shown in Fig. 5, the movable section 11 of the base is provided with spaced, depending lugs 13 disposed between which a cam 14 engages the opposing faces of the lugs and is operable to move the base section 11 toward or away from the base section 10. A shaft 15 is provided on which the cam 14 is secured and on the shaft 15 a driven gear 16 is in mesh with a drive gear 17 on a shaft 17' which may be driven by any suitable source of power.

Mounted respectively on top of the stationary base 10 and on the movable base 11 there is a pair of welding electrodes 19 and 18 which extend toward each other and are provided with opposed end wall surfaces 21 and 20 respectively. The electrodes 18 and 19 seat on and are insulated from the base sections 11 and 10 respectively by suitable electric insulating material 22, the electrodes and insulating material being secured to the base sections 10 and 11 by screws 23 which are also insulated from the bases by suitable electric insulating material. The screws 23 may also serve as the terminals for the electrodes and are connected by lead wires 25 to a source of electric current suitable for welding purposes.

Mounted on the base section 10 there is an upper casing or frame structure 26 and mounted on the movable base section 11 there is an upper casing or frame structure 27 which is similar to the upper frame structure 26. The upper frame structure 26 includes an end wall 28 from which spaced side walls 29 extend toward the other frame structure 27 and and terminate in vertically extending, outturned flanges 30. Similarly, the upper structure 27 includes an end wall 31 from which integral side walls 32 extend toward the structure 26 and terminate in outturned flanges 33. The flanges 30 and 33 serve respectively as vertical guides for vertically movable supporting plates 34 and 35 which at their opposite ends are provided with inwardly facing guide channels 36 and 37 respectively to receive the outturned flanges 30 and 33.

Rigidly secured respectively to the lower ends of the vertically movable supporting plates 34 and 35 is a pair of plate-like clamping members 41 and 42 which respectively and immediately overlie the electrodes 19 and 18. Preferably electric insulating material 43 is disposed between the lower ends of each of the supporting plates 34 and 35 and the clamping members 41 and 42 carried thereby. The clamping member 41 and the electrode 19 engage opposite sides of a metallic sheet 44 adjacent one edge thereof to hold the sheet 44 against movement and the other clamping member 42 and the electrode 18 engage opposite sides of another metallic sheet 45 to hold it while the said edges of the sheets are jammed together by movement of the base section 11 and casing 27 carried thereby toward the right, facing Fig. 5. The clamping members 41 and 42 are individually forced downwardly to clamp the sheets respectively to the electrodes 19 and 18 preferably by pneumatic or hydraulic power means. As shown in Figs. 1 and 2, one or more cylinders 46 are mounted on the top walls of each of the upper casings 26 and 27 and pistons 47 in the cylinders are rigidly connected by connecting rods 48 to outturned lugs 49 of the clamp carrying plates 34 and 35. The cylinders 46 may receive fluid under pressure from any suitable source to force the pistons downwardly to clamp the metallic sheets 44 and 45 to the electrodes 19 and 18 respectively.

As shown in Figs. 2 and 5, the upper casings 26 and 27 are rigidly secured respectively to the stationary base section 10 and to the movable base section 11 by bolts 50. Preferably the casings 26 and 27 are pivoted or hinged, as at 51, adjacent their end walls 28 and 31 to ears 52 and 53 provided respectively on the base sections 10 and 11 so that upon release of the bolts 50 the upper casings may be swung outwardly away from each other to give access to the structure within the casings and to the structure mounted on the base sections 10 and 11. Rigidly secured to an under surface of the clamping member 41 there is a plate member 55 and rigidly secured to the electrode 19 there is a similar plate 56, the plates 55 and 56 diverging outwardly to provide a guide for the metallic sheets. Similarly diverging plates 57 and 58 are respectively secured to the clamping member 42 and the electrode 18 to provide a guide for entrance of the metallic sheets between the clamps and electrodes.

As previously mentioned, when the edges of the metallic sheets to be welded are jammed together during flow of the current through the adjacent border portions of the sheets, the metal is upset leaving a so-called flash which is designated by the numeral 60, Figs. 5 and 6, which flash is required to be removed so that the welded together sheets will have continuously smooth surfaces on both sides thereof. In order to remove the flash 60 without removing the sheets from beneath the clamps 41 and 42, I provide cutting means arranged to operate above the sheets in the space between the clamp carrying plates 34 and 35 and cutting means arranged to operate below the metallic sheets between the adjacent spaced walls, as at 62 and 63, respectively of the base sections 10 and 11.

Carried by the clamp carrying plate 34 between the plates 34 and 35 there is a guideway including a channel member 65 which is disposed against the inner wall surface of the plate 34 and extends transversely of the machine or of the sheets of metal passing therethrough. Fitted over the channel member 65, a second channel member 66 cooperates therewith to provide a track or enclosed slideway 66a wherein a chain 67 is guided to prevent the chain from buckling, the chain 67 being secured at one end thereof to a carrier 68 for a plurality of spaced cutters 69. The channel members 65 and 66 are rigidly secured together and to the supporting plate 34 by screws or bolts 70 or by any other suitable means. The carrier 68, as shown in Fig. 1, is in the form of a plate and, as shown in Fig. 6, one side of the carrier plate 68 is slotted or recessed to receive the channel member 66 on which the carrier plate is slidably supported. Removable flange members 71 are secured to the carrier plate 68 and cooperate with the recessed wall thereof to provide retaining channels for retaining the carrier plate on the guide channel 66. Preferably the cutters 69 are separately or individually secured to their common carrier 68 in recesses provided therein and each of the cutters is preferably provided with a holder 72 which may be secured by screws 73 to the carrier plate 68. The cutting edges, as at 74, of the cutters 69 extend below their respective holders 72 and are arranged to move between the spaced, opposed end faces of the clamping members 41 and 42. As illustrated in Fig. 8, the cutters 69 are arranged such that each removes some of the excess material or flash 60 thus distributing the cutting away of the flash between the several cutters. Screws 75 individually secure the cutters 69 to the carrier plate 68 and, by means of the screws, the cutters may be adjusted vertically to arrange the cutting edges thereof so that each of the cutters will remove some of the weld flash, the cutters being arranged such that the entire flash is removed by a single movement of the cutters across the sheet metal.

The lower cutting unit is mounted on the base section vertical wall 62 and, since this unit is the same in structure as the previously described cutting unit, repetition of the description is deemed unnecessary and, therefore, the like parts of the two cutting units are designated by like numerals. The lower cutters extend upwardly between the spaced opposed faces 20 and 21 of the welding electrodes 18 and 19 and operate to remove or cut away the weld flash 60 from the underside of the welded together metallic sheets. The corresponding ends of the upper and lower chains 67 may be secured to their respective cutter supporting plates 68 by pins 76, Fig. 6, or by other suitable means.

To move the upper and lower cutting units across the sheet metal to cut away the flash 60, the cutting units are pushed through the medium of the chains 67 which are driven preferably by an electric motor 80. Referring more particularly to Fig. 7, the electric motor 80 is mounted on and externally of a gear casing 81, wherein a driven gear 82 on the drive shaft of the motor 80 meshes with and drives a gear 83 which is fixed on a rotatable shaft 84 supported in bosses 85 of the casing 81. Securely fixed on the shaft 84, a worm gear 86 meshes with a worm wheel 87 which is keyed to a vertically extending, rotatable shaft 88. The shaft 88 extends upwardly through a casing 90 wherein a gear 91 is keyed to the shaft 88 in mesh with the lower chain 67, the casing 90 providing a guide passage 92 around the gear 91 for the lower chain. The guide passage 92 and the lower chain guideway 66a on the wall 62 are connected by an intermediate guideway 93, see Fig. 1. The intermediate guideway 93 is rigidly secured at one end thereof to the vertical wall of the base 10 by screws 94 and is rigidly secured at the other end thereof by screws or by other suitable means.

The vertical shaft 88 extends upwardly above the casing 90 and the upper end of the shaft 88 is hollow to receive a lower end portion of a second shaft 88a which is splined to shaft 88, as at 88b. The shaft 88a extends through a second casing 88c wherein a gear 95 is keyed to the shaft 88a and meshes with the upper chain 67. The casing 88c provides a guide channel 96 for the upper chain 67, the guide channel 96 being connected to the upper guideway 66a by an intermediate chain guideway member 97. Integral with the upper and lower casings 88c and 90 are horizontally extending U-shaped guide channels 98 of which only the upper channel is shown, see Fig. 2. It will be seen that the splined connection between shafts 88 and 88a permits raising of the upper cutting unit with the clamp supporting plate 34 without disconnecting the upper chain from its power drive means.

Intermediate the upper and lower casings 88c and 90 there is a control means for reversing the electric motor 80, the control means being supported by a casing 100 which surrounds the shaft 88 and is mounted on the top of the casing 90. Within the casing 100, a gear 101 is secured to the vertical shaft 88 and drives a gear 102 which is secured to the upper end of a vertical shaft 103. The shaft 103 is rotatably supported in a boss 104 which is integral with and internally of the casing 100 and secured to the lower end of the shaft 103 a bevel gear 105 meshes with a larger bevel gear 106 which carries a pair of radially spaced switch operating arms 107 and 108. Mounted on the casing 100 externally thereof a switch, designated in general by the numeral 110, is provided with an operating member 111 which is operated or moved in one direction by the operating arm 108 to cause the motor 80 to rotate the shaft 88 in one direction to move the cutting units to cut away the flash 60, after which the operating arm 107 actuates the switch 110 to reverse the motor 80 and return the cutting units to the positions shown in dot and dash lines in Fig. 1.

The motor 80, gear mechanism and other structure which are mounted on the gear casing 81 are slidably supported in guideways on a base 112, Figs. 1 and 7. The casing 81 is provided with a depending lug 113 provided with a threaded bore to receive a screw 114 which may be rotated by any suitable source of power to slide the upper structure along its base.

*Operation*

In operation of the above described machine, the metallic sheets 44 and 45 may be fed from left to right facing Fig. 5, for example, during which time the clamping members 41 and 42 are held in raised positions, spaced from the electrodes 18 and 19 by fluid pressure acting against the undersides of the pistons 47. Prior to the positioning of the metallic sheets 44 and 45 in the welding machine, the base section 11 and the upper frame or casing 27 carried thereby is moved away from the base section 10 by the cam 14. When the sheets 44 and 45 are in proper positions on the electrodes 18 and 19, the clamping members 41 and 42 are moved down by the fluid pressure acting against the upper ends of the pistons 47 and clamp the sheets 44 and 45 respectively to the electrodes 19 and 18, border portions of opposed edges of the sheets projecting slightly beyond or past the opposed faces of the clamping members and electrodes. With the metallic sheets 44 and 45 held by the clamping members to the electrodes, the cam 14 moves the base section 11 and structure carried thereby toward the stationary base 10 during which time the welding current flows from the electrode 19 through the clamped border portion of the sheet 44 and through the clamped border portion of the sheet 45 to the other electrode 18. As the edge of sheet 45 approaches the opposed edge of the sheet 44 the current flow from one to the other increases with corresponding increase in the heating of the edge portions of the sheets which are finally jammed together by the cam 14 to obtain a good weld. The flash 60 which results from the jamming of the sheets together is now removed by the cutters 69 which are moved between the opposed faces of the clamps 41 and 42 and between the opposed faces of the electrodes 18 and 19. In Fig. 1, the cutters 69 are shown at the right in dot and dash lines representing the starting position. When the reversible electric motor 80 is started in the proper direction (by interconnection of operating arm 111 and one of the two actuators 107 and 108), it rotates the vertical shaft 88 on which the vertically spaced gears 91 and 95 are keyed for rotation to move the upper and lower groups of cutters 69 by pushing the chains 67 connected thereto. The upper and lower groups of cutters 69 are thus moved to the left, Fig. 1, and remove the flash 60 from opposite sides of the welded together sheets 44 and 45. Upon completion of the cutting operation the other of the two actuators 107 and 108 engages and moves the operating arm 111 of the switch 110 which reverses the electric motor so that it may operate to return the upper and lower groups of cutting tools 69 to their starting position shown in dot and dash lines, Fig. 1. The welded sheets 44 and 45 are then moved to the right and the above operation is then repeated.

While I have shown and described my invention in detail it is to be understood that the same is to be limited only by the appended claims for many changes may be made without departing from the spirit and scope of the invention.

What I claim is:

1. In apparatus of the character described, supporting means for sheet metal, a pair of horizontally spaced vertically movable clamping members to hold a pair of metallic sheets to be welded together with edges thereof in opposed relation between said spaced clamping members, said clamping members having abutment surfaces for engaging the metallic sheets respectively, means for moving one of said pair of clamping members a limited distance toward the other and in spaced relation thereto, guide means on one of said clamping members, a movable carrier slidably guided by said guide means, a plurality of spaced cutters carried by said carrier, means for individually adjusting the cutters with respect to the abutment surfaces of said clamping members and said cutters being further guided between the clamping members and in contactual engagement therewith.

2. In a machine of the character described, an upper clamping unit provided with an elongated space, a lower clamping unit provided with a similar space, said units being adapted for supporting therebetween a work sheet having upper and lower elongated flash portions receivable within and extending along said spaces, one of said units being movable toward and from the other of said units to clamp and un-clamp the work sheet, a flash cutting unit carried by said one clamping unit for movement therewith and also for movement within and along the respective space for removing the respective flash portion, another flash cutting unit carried by said other clamping unit and movable within and along the respective space for removing the respective flash portion, a flexible driving chain connected to said second-named cutting unit and movable to move the latter for removing the respective flash portion, another flexible driving member connected to said first-named cutting unit for movement with said one clamping unit and movable to move said first-named cutting unit for removing the respective flash portion, a shaft connected to said first-named driving member and rotatable to move the latter, a second shaft connected to said second-named driving member and rotatable to move the latter, and slidable connecting means between said shafts to rotate the one by the other and enable said second-named shaft and said second-named driving member to move unitarily with said one clamping unit relatively to said first-named shaft.

3. In a machine of the character described, an upper clamping unit provided with an elongated space, a lower clamping unit provided with a similar space, said units being adapted for supporting therebetween a work sheet having upper and lower elongated flash portions receivable within and extending along said spaces, one of said units being movable toward and from the other of said units to clamp and un-clamp the work sheet, a flash cutting unit carried by said one clamping unit for movement therewith and also for movement in one direction within and along the respective space for removing the respective flash portion, another flash cutting unit carried by said other clamping unit and movable in a similar direction within and along the respective space for removing the respective flash portion, a flexible link driving member connected to said second-named cutting unit and movable to move the latter for removing the respective flash portion, another flexible link driving member connected to said first-named cutting unit for movement with said one clamping unit and movable to move said first-named cutting unit for removing the respective flash portion, a shaft connected to said first-named driving member and rotatable in one direction to move the latter for its flash removing operation, a second shaft slidably connected to said second-named driving member and rotatable in a similar direction to move the latter for its flash removing operation, connecting means between said shafts to rotate the one by the other and enable said second-named shaft and said second-named driving member to move unitarily with said one clamping unit relatively to said first-named shaft, and means controlled by the rotation of said shafts in said one direction for reversing said rotation and thereby reversing the movement of said cutting units.

4. In a machine of the character described, an upper work support movable downwardly toward and upwardly away from a lower work support for clamping and un-clamping an intermediately positioned work sheet having upper and lower flash portions to be removed therefrom, an upper cutting unit carried by said upper support for downward and upward movement therewith and movable rectilinearly relatively to said upper support in cutting engagement with said upper flash portion to remove the latter from said sheet, a lower cutting unit carried by said lower support and movable rectilinearly relatively thereto in cutting engagement with said lower flash portion to remove the latter from said sheet, a pair of vertical shafts arranged in end-to-end relationship and interconnected so that the upper shaft is rotatably driven by the lower shaft and free the while to move axially downwardly and upwardly relatively thereto, a flexible link chain interconnecting said lower cutting unit and said lower shaft and operable responsive to rotation of the latter for rectilinearly moving the former, and a flexible link chain interconnecting said upper cutting unit and said upper shaft and arranged to move bodily downwardly and upwardly with the latter, the former and said upper work support, said last mentioned flexible link chain being operable responsive to rotation of said upper shaft for rectilinearly moving said upper cutting unit.

5. In a machine of the character described, an upper work support movable downwardly toward and upwardly away from a lower work support for clamping and un-clamping an intermediately positioned work sheet having upper and lower flash portions to be removed therefrom, an upper cutting unit carried by said upper support for downward and upward movement therewith and movable rectilinearly relatively to said upper support in cutting engagement with said upper flash portion to remove the latter from said sheet, a lower cutting unit carried by said lower support and movable rectilinearly relatively thereto in cutting engagement with said lower flash portion to remove the latter from said sheet, a pair of vertical shafts arranged in end-to-end relationship and interconnected so that the upper shaft is rotatably driven by the lower shaft and free the while to move axially downwardly and upwardly relatively thereto, a pair of sprockets fixed one to said lower shaft for rotation therewith and the other to said upper shaft for rotation and for downward and upward movement therewith, a pair of chains fixed one at one end to said lower cutting unit and the other at one end to said upper cutting unit, the lower chain of said pair being in driven connection with said lower sprocket and the upper chain of said pair being in driven connection with said upper sprocket, a rigid housing connected at one end to said lower cutting unit and enclosing said lower chain for at least the portion of the length thereof between said lower cutting unit and said lower sprocket to prevent flexing of said length portion, and another rigid housing connected to said upper cutting unit and about said upper sprocket and enclosing the portion of said upper chain residing therebetween to prevent flexing of said latter portion and to enable said upper cutting unit, said upper housing, said upper chain, said upper sprocket and said upper shaft to move downwardly and upwardly unitarily with said upper support.

6. In apparatus of the character described, a pair of lower work supporting jaws, a pair of upper work supporting jaws, means for moving the upper jaws toward and away from the lower jaws, means for moving one of the upper and lower jaws a limited distance toward the other upper and lower jaws, whereby work may be clamped between each pair of upper and lower jaws and moved in abutting edge to edge relationship, a cutting member guided by one of the upper jaws, a cutting member guided on one of the lower jaws, said cutting members being further guided by contactual engagement between the respective edges of said pair of upper and lower jaws whereby the work will be cut an equal distance on each of its abutting sides.

HENRY EARL MORTON.